R. B. HARTSOUGH.
TRACTION MACHINE.
APPLICATION FILED MAY 31, 1918.

1,285,995.

Patented Nov. 26, 1918.
2 SHEETS—SHEET 1.

INVENTOR:
RALPH B. HARTSOUGH.
BY
ATTORNEYS.

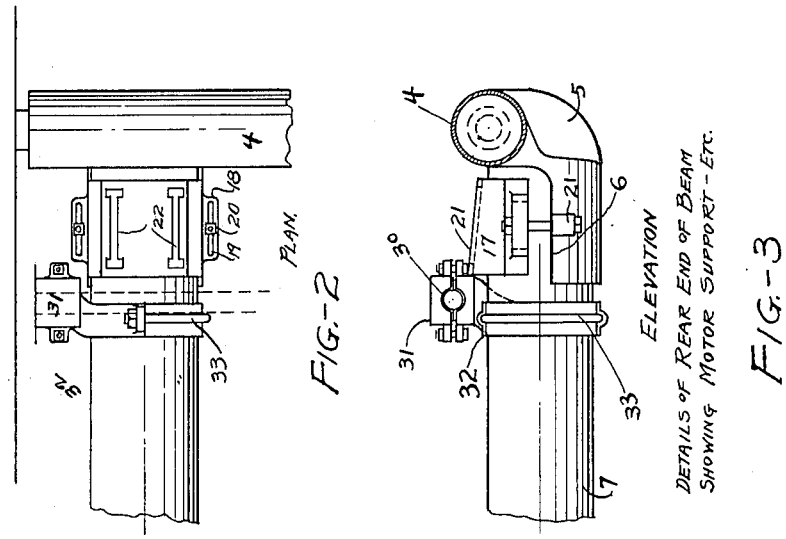
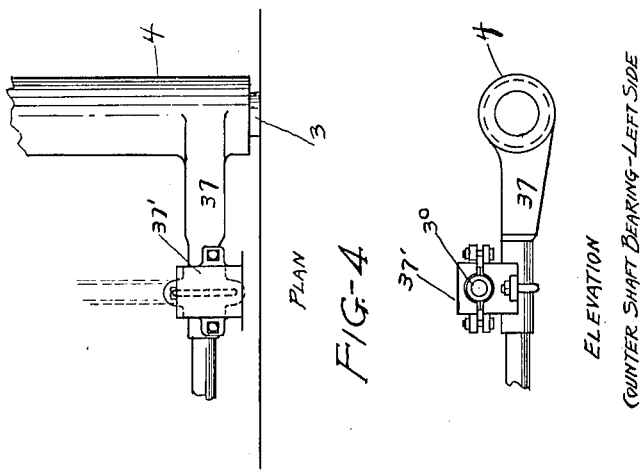

UNITED STATES PATENT OFFICE.

RALPH B. HARTSOUGH, OF MINNEAPOLIS, MINNESOTA.

TRACTION-MACHINE.

1,285,995.

Specification of Letters Patent. Patented Nov. 26, 1918.

Application filed May 31, 1918. Serial No. 237,536.

*To all whom it may concern:*

Be it known that I, RALPH B. HARTSOUGH, a citizen of the United States, resident of Minneapolis, county of Hennepin, State of Minnesota, have invented certain new and useful Improvements in Traction-Machines, of which the following is a specification.

The object of my invention is to provide an improved type of frame for a tractor embodying a means for mounting the motor thereon to the end that the motor may be adjusted forward or backward or tilted to either side to properly adjust it on the frame and aline its working parts with the other mechanism of the machine.

A further object is to provide a frame for a tractor of comparatively light construction and at the same time one which will be strong and durable.

The invention consists generally in various constructions and combinations, all as hereinafter described and particularly pointed out in the claims.

In the accompanying drawings forming part of this specification,

Fig. 2 is a detail view of a portion of the machine frame showing the seat for the motor thereon, Fig. 3 is a sectional view through the frame of the machine, showing the motor bed in side elevation, Figs. 4 and 5 are detail views showing the counter shaft bearing and the manner of mounting it on the frame.

Figure 1:
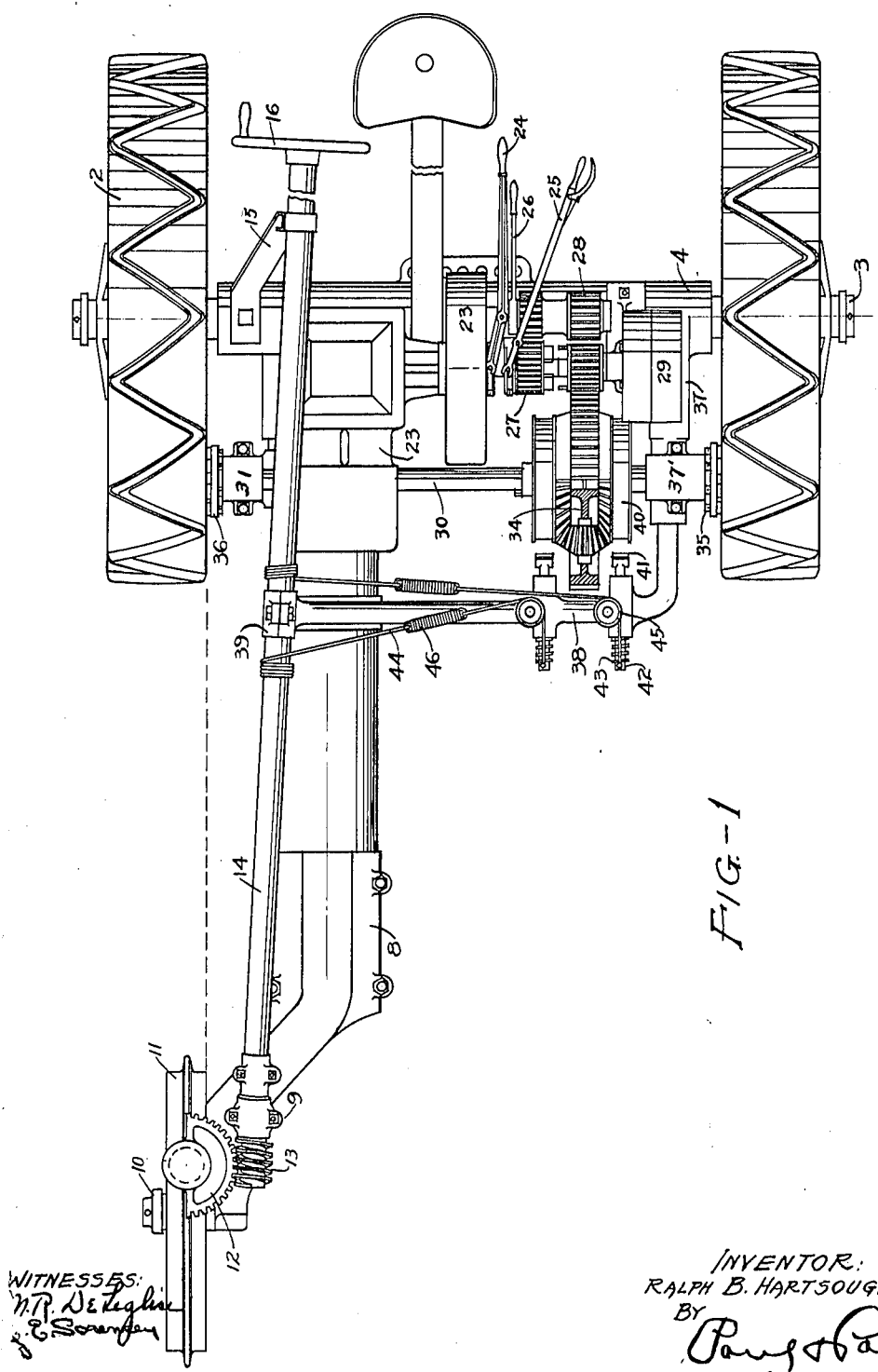
Figure 1 is a plan view of a traction machine embodying my invention.

In the drawing, 2 represents the traction wheels of the machine, 3 the axle therefor and 4 the rear portion of the frame which forms a housing for said axle. Near the right hand end of said frame and projecting downwardly and forwardly therefrom is a stirrup 5 formed integrally with the frame and provided with a horizontal seat 6 wherein the rear end of a beam 7, preferably of wood, is supported. At the forward end of said beam is a casting 8 having a laterally turned part 9 provided with a spindle 10 on which a pilot wheel 11 is journaled. This wheel is mounted to oscillate on a vertical axis through the medium of a sector-shaped gear 12 engaging a worm 13 on a steering post 14 which extends backwardly above the beam 7 and is supported at its rear end in a bracket 15 and is provided with a steering wheel 16. Upon the rear portion of the beam 7 I arrange a bed piece or block 17 having ears 18 thereon provided with longitudinal slots 19 to receive bolts 20 which are mounted in lugs 21 on opposite sides of the stirrup 5 in which the said beam is seated. By loosening these bolts, the block 17 may be moved forward or backward on the beam or may be tilted laterally thereon.

The top of the block has an inclined surface 21 provided with double T-slots 22 arranged in parallel relation in which the oppositely inclined base of the engine 23 is supported and is adapted for forward and backward movement to raise or depress the engine with respect to the beam and the other mechanism of the tractor. I am thus able to adjust the engine forward or backward on the beam to raise or lower it and I am also able to move the block on which the engine is mounted without changing the position of the engine thereon and tilt the said block to the right or the left as may be desired. The engine shaft has the usual fly wheel 23 and levers 24, 25 and 26 for controlling the pinions 27 and 28. A pulley 29 is preferably mounted on the end of the engine shaft. A counter-shaft 30 has a bearing 31 on a strap 32 that is secured to the beam by suitable means, such as a bolt 33, and a differential mechanism 34 is mounted on the said counter-shaft for controlling the drive pinions 35 and 36 which mesh with internal gears on the traction wheels 2. The left hand end of the frame has a forwardly projecting bracket 37 having a bearing 37' for the counter-shaft 30 and provided with an arm 38 inwardly turned and extending in a direction transversely with respect to the beam and provided with a bearing at 39 for the steering wheel post 14. The differential mechanism has brake drums 40 mounted on the opposite sections thereof and brake shoes 41 are mounted in studs 42 having bearings in the arm 38 and slidable therein and held by compression springs 43 out of engagement with the brake drums. Cables 44 engage anti-friction wheels 45 on the said arm 38 and are connected with the post 14 to be wound thereon when said post is rotated for the purpose of moving the shoes 41 into engagement with the brake drums. Springs 46 are mounted in the cables 42 and adapted to yield and allow continued movement of the steering post when the shoes have contacted with their respective drums. This construction reduces the tractor apparatus to a minimum of parts.

I claim as my invention:

1. A tractor frame comprising a transverse member forming a housing for the traction wheel axle, said member having a downwardly and forwardly extending stirrup formed thereon, a beam seated in said stirrup and having a guiding and supporting wheel at its forward end, a block seated on the rear portion of said beam, and means securing it to said stirrup for forward or backward adjustment thereon, the top of said block having a seat and means for securing the motor thereon.

2. A tractor frame comprising a hollow transverse member, an axle mounted therein, supporting wheels for said axle, said member having a forwardly projecting stirrup, a beam seated in said stirrup and having a guiding and supporting wheel at its forward end and a motor base supported on said beam and secured for rotary adjustment thereon to said stirrup.

3. A traction machine comprising a frame, a forwardly extending beam seated in said frame, a block mounted on said beam for forward and backward or rotary adjustment, said block having an upper surface for securing the base of a motor thereon.

4. In a traction machine, the combination, with a forwardly extending beam having a curved upper surface, of a block having a curved under surface to fit said beam and mounted for forward and backward or rotary adjustment thereon, said block having an upper surface for securing the base of a motor thereon.

5. In a traction machine, the combination, with a beam, of a block mounted for forward and backward adjustment thereon and having an upper surface provided with longitudinal slots, and a motor having a base seated on said upper surface and adjustable forwardly and backwardly in said slots.

6. In a traction machine, the combination, with a frame, of a beam supported therein and projecting forwardly therefrom, a block seated on said beam and provided with laterally projecting ears having longitudinal slots therein, bolts passing through said slots and engaging lugs in said frame, said block being adjustable forwardly and backwardly on said beam and bolts and the top of said block having a surface for securing a motor thereto.

7. A traction machine comprising a frame having a transverse portion forming a housing for the traction wheel axle, a beam having its rear end seated in said frame at one side of the center thereof and projecting forwardly therefrom, a motor supported on said beam, a bracket projecting forwardly from said frame on the other side of the center with respect to said beam and having an inwardly turned portion extending transversely with respect to said beam, a counter shaft having bearings in said bracket and said beam between the transverse portion of said bracket and said housing and a gear mechanism connecting said engine shaft with said counter shaft.

8. A traction machine comprising a frame having a transverse portion forming a housing, an axle mounted in said housing and traction wheels mounted on said axle, a beam having its rear end seated in said frame adjacent one of said traction wheels and projecting forwardly therefrom, a guiding wheel mounted in the forward portion of said beam, a steering post connected with said guiding wheel and having its rear portion supported in said frame, a motor mounted on the rear portion of said beam and having its shaft extending transversely with respect to said beam and above the same, a bracket projecting forwardly from said housing near the other traction wheel and having an inwardly turned transversely extending part forming a bearing for the middle portion of said steering post, a counter shaft journaled in bearings on said beam and said bracket in the rear of the transversely extending part of said bracket and having pinions geared to said traction wheels, and a transmission gearing connecting said counter shaft with said motor shaft between said motor and said forwardly extending bracket.

9. A tractor frame comprising a transverse member and supporting traction wheels therefor, a beam projecting forwardly from said member at one side of the center thereof, a motor mounted on said beam, an arm projecting forwardly from said member on the other side of the center, a counter-shaft having bearings on said arm and beam and geared to said engine shaft and said engine and the boxes of said counter-shaft being mounted for rotary and forward and backward adjustment.

10. A traction machine comprising a frame and supporting traction wheels therefor, a beam projecting forwardly from said frame near one of said wheels, an arm projecting forwardly from said frame near the other of said wheels, a motor mounted on said beam, a counter-shaft having bearings on said arm and beam and geared to said wheels, a differential mechanism mounted on said counter shaft, and a variable speed transmission connecting said differential mechanism with said motor shaft and the bearings of said motor and said countershaft being mounted for relative adjustment.

11. In a traction machine, the combination, with a frame and supporting wheels therefor, of a beam projecting forwardly from said frame near one of said wheels, a block mounted on said beam for forward and backward or rotary adjustment thereon, a motor seated on said block and driving connections between said motor and said wheels.

In witness whereof, I have hereunto set my hand this 22nd day of May, 1918.

RALPH B. HARTSOUGH.